(12) United States Patent
Boomsma (10) Patent No.: US 12,502,015 B2
(45) Date of Patent: Dec. 23, 2025

(54) SNACK SYSTEM

(71) Applicant: LCeeeDesigns LLC, Lakeville, MN (US)

(72) Inventor: Leah Boomsma, Lakeville, MN (US)

(73) Assignee: LCeeeDesigns LLC, Lakeville, MN (US)

( * ) Notice: Subject to any disclaimer, the term of this patent is extended or adjusted under 35 U.S.C. 154(b) by 0 days.

(21) Appl. No.: 18/759,811

(22) Filed: Jun. 29, 2024

(65) Prior Publication Data
US 2025/0351983 A1 Nov. 20, 2025

Related U.S. Application Data (60) Provisional application No. 63/648,127, filed on May 15, 2024.

(51) Int. Cl.
| | |
|---|---|
| *A61J 9/00* | (2006.01) |
| *A47G 19/22* | (2006.01) |
| *A61J 9/06* | (2006.01) |
| *A61J 11/00* | (2006.01) |
| *B65D 8/00* | (2006.01) |
| *B65D 21/02* | (2006.01) |
| *B65D 25/28* | (2006.01) |

(52) U.S. Cl.
CPC .......... *A47G 19/2272* (2013.01); *A61J 9/008* (2013.01); *A61J 9/0623* (2015.05); *A61J 11/00* (2013.01); *B65D 11/02* (2013.01); *B65D 21/0209* (2013.01); *B65D 25/2811* (2013.01); *B65D 2525/285* (2013.01)

(58) Field of Classification Search
CPC .. B65D 25/2511; B65D 11/02; B65D 25/285; B65D 25/2811; A61J 9/00; A61J 9/08; A61J 9/0623; A61J 11/00; A47G 19/01

USPC .............................. 215/11.1, 11.3
See application file for complete search history.

(56) References Cited

U.S. PATENT DOCUMENTS

| | | | |
|---|---|---|---|
| 2,039,373 A | 5/1936 | Wittmann | |
| 2,969,167 A | 1/1961 | Libit | |
| 3,207,349 A | 9/1965 | Rabe | |
| 3,661,288 A * | 5/1972 | Noll ..................... | A61J 11/0005 215/11.1 |
| 3,908,864 A | 9/1975 | Capper | |

(Continued)

OTHER PUBLICATIONS

Momcozy Squeeze Pouch Holder, Amazon, available at https://www.amazon.com/Momcozy-Squeeze-Pouches-Self-Feed-Comfortable/dp/B0CLYD828Z (Accessed Sep. 20, 2024).

*Primary Examiner* — Sue A Weaver
(74) *Attorney, Agent, or Firm* — Headland Law & Strategy; Matthew J. Smyth (57) ABSTRACT

A kit may have a plurality of components that include (A) a holder having a generally frustoconical shape, a first end that is open, a second end that defines a slot opening, a middle portion disposed between the first end and the second end, and a circumferential sidewall that (i) is generally closed except for a sidewall opening adjacent the slot opening and that (ii) defines an open interior; (B) an elastomeric handle having a retention portion and at least one finger grip; (C) an elastomeric sip top having a sip-top sidewall and a sip-top surface that define an interior cavity, and a nipple disposed on the sip-top surface; and (D) an elastomeric snack top having a snack-top sidewall, a snack-top surface, and a snack-access slot disposed on the snack-top surface.

6 Claims, 6 Drawing Sheets

(56) References Cited

U.S. PATENT DOCUMENTS

| | | | |
|---|---|---|---|
| 3,964,636 | A | 6/1976 | Rehrig |
| 4,865,208 | A | 9/1989 | Lax et al. |
| 5,454,483 | A | 10/1995 | Ichikawa et al. |
| 5,938,053 | A * | 8/1999 | Verbovszky ....... A47G 19/2272 215/11.4 |
| 6,142,344 | A | 11/2000 | Kai |
| 7,175,037 | B2 | 2/2007 | Deir |
| 7,214,397 | B1 | 5/2007 | Renna |
| 7,798,346 | B2 | 9/2010 | Nelson et al. |
| 7,845,145 | B2 | 12/2010 | Schroeder |
| 7,886,505 | B1 | 2/2011 | Dunaway |
| 8,833,598 | B2 | 9/2014 | Hammi |
| 9,085,398 | B1 | 7/2015 | Fellin et al. |
| 9,144,336 | B2 | 9/2015 | Hammi |
| 9,161,887 | B2 | 10/2015 | McBean et al. |
| 9,480,625 | B2 | 11/2016 | McBean et al. |
| D773,898 | S | 12/2016 | Fellin et al. |
| 9,675,525 | B2 | 6/2017 | McBean et al. |
| 9,694,485 | B1 * | 7/2017 | Mellin ..................... B25G 1/02 |
| 9,713,576 | B2 | 7/2017 | McBean et al. |
| 9,789,988 | B2 | 10/2017 | Wilson |
| 10,182,971 | B2 | 1/2019 | McBean et al. |
| 10,239,647 | B2 | 3/2019 | Wilson |
| 10,377,559 | B1 | 8/2019 | Boomsma |
| D867,828 | S | 11/2019 | Boomsma |
| D939,358 | S | 12/2021 | Hammi |
| 11,235,900 | B2 | 2/2022 | Wilson |
| 11,299,300 | B2 | 4/2022 | Hammi et al. |
| D952,414 | S | 5/2022 | Boomsma |
| D966,040 | S | 10/2022 | Boomsma |
| 11,465,821 | B1 * | 10/2022 | Boomsma .............. B65D 47/06 |
| 2004/0124168 | A1 * | 7/2004 | Silver .................... A61J 11/045 215/11.1 |
| 2005/0118309 | A1 | 6/2005 | Beckam |
| 2006/0138168 | A1 | 6/2006 | Last et al. |
| 2011/0042399 | A1 | 2/2011 | Schroeder |
| 2011/0062043 | A1 | 3/2011 | Bougoulas et al. |
| 2011/0151069 | A1 | 6/2011 | Harding |
| 2012/0298676 | A1 | 11/2012 | Cooks |
| 2015/0076178 | A1 | 3/2015 | Hammi |
| 2015/0122842 | A1 | 5/2015 | Berg, Jr. et al. |
| 2016/0015603 | A1 * | 1/2016 | McBean ................. A61J 9/005 53/469 |
| 2016/0101924 | A1 | 4/2016 | Mitchell et al. |
| 2017/0291740 | A1 | 10/2017 | Genaw, Jr. et al. |
| 2020/0354092 | A1 | 11/2020 | Hammi et al. |
| 2021/0179319 | A1 | 6/2021 | Gersovitz |
| 2022/0185511 | A1 | 6/2022 | Hammi et al. |

* cited by examiner

SNACK SYSTEM

CROSS REFERENCE TO RELATED APPLICATIONS

This application claims priority to U.S. Application Ser. No. 63/648,127, titled "Snack System," filed on May 15, 2024. This application incorporates the entire contents of the foregoing application herein by reference.

TECHNICAL FIELD

Various implementations relate generally to snack systems—in particular, for example, snack systems that include various interchangeable components that may facilitate eating and drinking of various food items.

BACKGROUND

Those who are just learning to feed themselves and who may have limited dexterity or not-yet-developed fine motor skills may benefit from snack and drink containers that provide handles and protective storage for dry snacks, juice, juice boxes, food pouches, and the like.

SUMMARY

In some implementations, a snack system includes one or more of a holder, an elastomeric handle, an elastomeric sip top, an elastomeric snack top, a lid, and a snack cup.

The holder may have (i) a generally frustoconical shape, (ii) a first end that is open, (iii) a second end that defines a slot opening, (iv) a middle portion disposed between the first end and the second end, and (v) a circumferential sidewall (A) that is generally closed except for a sidewall opening adjacent the slot opening and (B) that defines an open interior.

The elastomeric handle may have a retention portion that is configured to be removably coupled to the middle portion with a compression fit. The elastomeric handle may further have at least one finger opening.

The elastomeric sip top may have a sip-top sidewall and a sip-top surface. The sip-top sidewall and sip-top surface may define an interior cavity. A nipple may be disposed on the sip-top top surface. The sip-top sidewall may be configured to be (a) disposed around the circumferential sidewall at the second end or (b) disposed in the open interior at the first end.

The elastomeric snack top may have a snack-top sidewall and a snack-top surface. A snack-access slot may be disposed in the snack-top surface, and the snack-top sidewall may be configured to be disposed around the circumferential sidewall at the first end.

The lid may be configured to be releasably coupled to the first end. The lid may include at least one opening that is configured to facilitate passage of a drinking straw from outside the holder.

The snack cup may be configured to be (x) removably stowed around the second end of the holder, (y) employed with the elastomeric sip top to provide a sip cup function, or (z) employed with the elastomeric snack top to provide a snack cup function.

In some implementations, a method includes providing a snack system kit and providing instructions for using the snack system kit. The kit may have a plurality of components that include (A) a holder having a generally frustoconical shape, a first end that is open, a second end that defines a slot opening, a middle portion disposed between the first end and the second end, and a circumferential sidewall that (i) is generally closed except for a sidewall opening adjacent the slot opening and that (ii) defines an open interior; (B) an elastomeric handle having a retention portion and at least one finger grip; (C) an elastomeric sip top having a sip-top sidewall and a sip-top surface that define an interior cavity, and a nipple disposed on the sip-top surface; and (D) an elastomeric snack top having a snack-top sidewall, a snack-top surface, and a snack-access slot disposed on the snack-top surface. Providing instructions may include providing instructions to (x) collectively nest the plurality of components together in a stowed configuration or (y) employ subsets of the plurality of components in combination with each other to provide discrete functions.

Providing instructions to collectively nest the plurality of components together may include providing instructions to fold and compress each of the elastomeric handle, elastomeric sip top and elastomeric snack top and dispose each, in a folded and compressed state, into the open interior.

Providing instructions may include providing instructions to (i) dispose a food pouch in the holder such that a spout of the food pouch extends through the slot opening, and (ii) dispose the retention portion of the elastomeric handle around the middle portion of the holder.

Providing instructions may include providing instructions to (i) dispose a food pouch or a drink pouch in the holder such that a spout of the food pouch or the drink pouch extends through the slot opening, (ii) dispose the nipple of the elastomeric sip top over the spout and the sip-top sidewall over the circumferential sidewall of the holder at the second end, and (iii) dispose the retention portion of the elastomeric handle around the middle portion of the holder.

In some implementations, the plurality of components may further include a rigid lid that is configured to be releasably coupled to the first end. The rigid lid may include at least one opening. Providing instructions may include providing instructions to dispose a juice box into the open interior of the holder from the first end, enclose the juice box in the holder by coupling the rigid lid to the first end, and dispose a drinking straw through the at least one opening, into the juice box.

In some implementations, the plurality of components may further include a snack cup that is configured to be removably stowed around the second end of the holder. Providing instructions may include providing instructions to dispose dry snacks in the snack cup and to dispose the elastomeric snack over an open end of the snack cup.

Providing instructions may include providing instructions to (i) dispose the elastomeric sip top, nipple first, inside the first end; (ii) dispose dry snacks in the interior cavity; and (iii) dispose the elastomeric snack top on the first end. Providing instructions may further include providing instructions to dispose the elastomeric handle around the middle portion.

DETAILED DESCRIPTION

Figure 1:
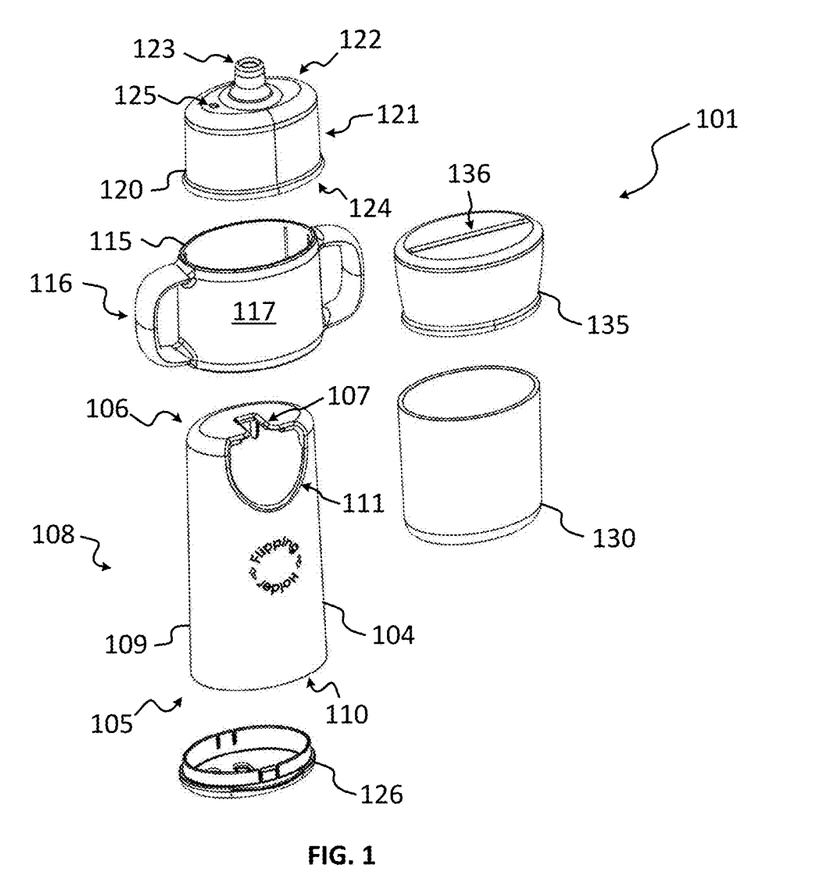
FIG. 1 illustrates an exemplary snack system.

FIG. 1 shows an exemplary snack system 101 that includes a holder 104, an elastomeric handle 115, an elastomeric sip top 120 and a lid 126. As shown, the snack system 101 may also include a snack cup 130 and an elastomeric snack top 135. In some implementations, the various components of the snack system 101 may be configurable in various ways to assist a user in storing, protecting and consuming dry snacks 202 (see FIG. 2), juice boxes 204, food pouches 206 and the like. The snack system 101 may be configurable in ways that minimize spills or leaks, and various configurations may further provide handles or other easily grasped surfaces that provide users with the ability to hold their snack, drink or food items.

The holder 104 may have a generally frustoconical shape and may include a first end 105 that is open, a second end 106 that includes a slot opening 107, and a middle portion 108 between the first end 105 and the second end 106. As shown, the holder 104 includes a circumferential sidewall 109 that defines an open interior 110. In some implementations, the circumferential sidewall 109 is generally continuous, except for a sidewall opening 111 adjacent the slot opening 107. The holder 104 may comprise a plastic, polymer or relatively hard silicone or rubber (e.g., one having a Shore D durometer of between about 50 and 80). In some implementations, the holder 104 resists radial deformation-thereby protecting contents therein against being squeezed.

The elastomeric handle 115 may be made of a resilient and elastic material (e.g., silicone or natural or synthetic rubber) and may include at least one finger opening 116. In some implementations, the resilient and elastic material has a Shore A durometer of between about 25 and 75; and in some implementations, the material preferably has a Shore A durometer of between about 55 and 65. A retention portion 117 may be configured to be removably coupled to the middle portion 108 of the holder 104 via a compression fit. That is, in some implementations, the elastomeric handle 115 is configured with a diameter that is larger than the narrower second end 106 but smaller than than the broader first end 105, such that it stretches over and couples to, via a compression fit, the middle portion 108. In some implementations, a compression fit between the middle portion 108 and the elastomeric handle 115 may be further enhanced by a coefficient of friction between the material of the elastomeric handle 115 and the material of the holder 104, which coefficient of friction resists lateral movement of the materials against each other.

The elastomeric sip top 120 may include a sip-top sidewall 121 and sip-top surface 122, as well as a nipple 123. The sip-top sidewall 121 and sip-top surface 122 may define an interior cavity 124 that is fluidly isolated from a region exterior to the elastomeric sip top 120 except through an opening in the nipple 123, and, in some implementations, a vent 125. The elastomeric sip top 120 may be configured to be coupled to the second end 106—for example, to provide a spill-resistant top to a food pouch 206, as will be described below.

A lid 126 may be provided that may be configured to snap into the open first end 105. As will be illustrated and described below, the lid 126 may include one or more openings that, in some implementations, may be suitable for passage of a straw for use with a juice box. The lid may be rigid, or at least have a firmness similar to that of the holder 104.

In some implementations, the snack system 101 further includes a snack cup 130 and a corresponding elastomeric snack top 135. The elastomeric snack top 135 may be made of a material similar to the elastomeric handle 115 and the elastomeric sip top 120—that is, a resilient and elastic material that facilitates a compression fit between the elastomeric snack top 135 and the snack cup 130. The elastomeric snack top 135 may include a snack-access slot 136 that permits access by a small hand (e.g., to retrieve dry snacks 202 that may be in the snack cup 130) but that otherwise seals off such dry snacks and prevents or minimizes their spilling when the snack cup 130 is tipped over or upside down. In particular, the snack-access slot 136 may define two or more portions of the elastic, resilient material that forms the elastomeric snack top 135, which two or more portions may, by design, be disposed against each other to form at least a weak seal that can be broken by the small hand of a snacker reaching in to retrieve dry snacks 202.

In some implementations, the snack cup 130 may be configured to fit over the second end 106 of the holder 104. That is, a frustoconical or otherwise tapered shape of the holder 104 may be such that an opening of the snack cup 130 can fit over the second end 106 of the holder 104, then engage with the widening diameter of the holder 104 closer to the middle portion 108, thereby retaining (e.g., through another compression or interference fit) the snack cup 130 against the holder 104 (e.g., for easy transport).

In such implementations, other elements may be configured to be stowed together. For example, the elastomeric sip top 120, the elastomeric handle 115 and the elastomeric snack top 135 may all be foldable, such they can be slid inside the interior 110; the snack cup 130 may then be stowed on the second end 106 of the holder 104; and the lid 126 may be disposed on the first end 105 of the holder 104—such that all components of the snack system 101 are conveniently organized and collected for easy transport.

Figure 2:
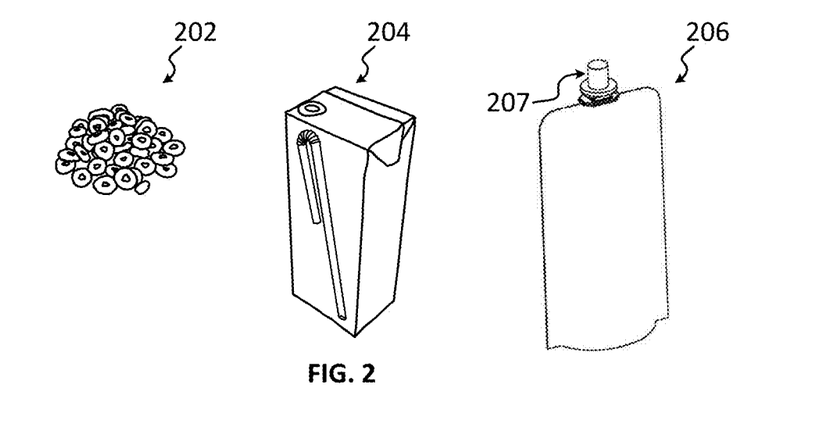
FIG. 2 illustrates exemplary items that may be stored in and dispensed from the snack system of FIG. 1.

FIG. 2 illustrates exemplary snack items that may be stored in and dispensed from the snack system 101. Such items may include dry snacks 202 (e.g., dry cereal, crackers), juice boxes 204, and food pouches 206 (e.g., with apple sauce, fruit or vegetable purees, protein purees, etc.). In some implementations, "dry snacks" may include snack or food items that take the form of individual loose kernels or pieces—whether "dry" or not—such as, for example, peas, corn, carrots, etc.

Figure 3:
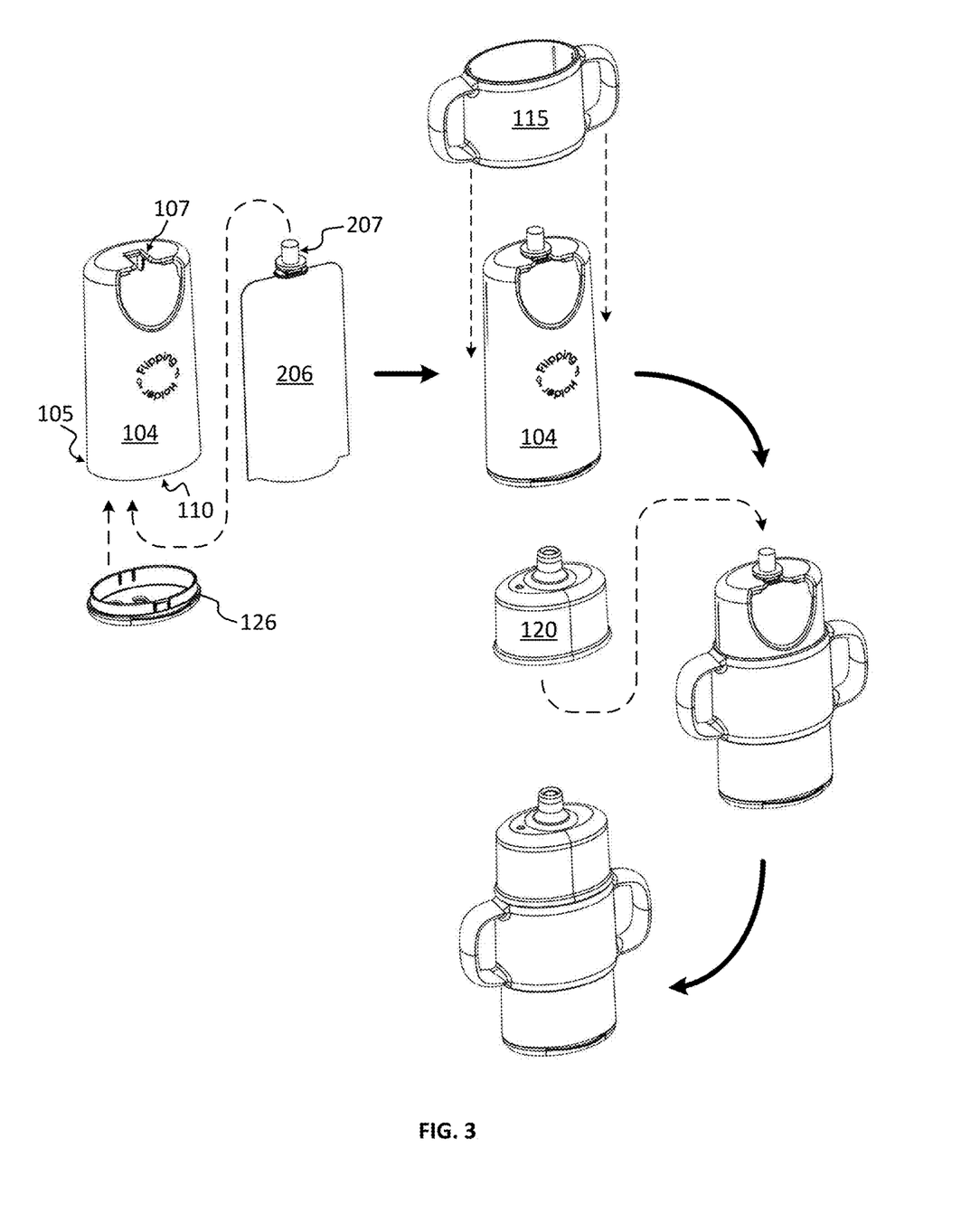
FIG. 3 depicts various components of the snack system used with a food pouch.

FIG. 3 depicts a process for using various components of the snack system 101 with a food pouch 206. In a first step, the food pouch 206 may be inserted into the open interior 110 of the holder 104—specifically, through the open first end 105. The food pouch 206 may be inserted into the open interior 110 such that its spout 207 is disposed in the slot opening 107. In some implementations, the slot opening 107 may couple to or pinch the spout 207 to secure it in place. In a second optional step, the elastomeric handle 115 may be disposed on the holder 104. In a third optional step, the elastomeric sip top 120 may be disposed over the holder 104 and the spout 207 of the food pouch. In such implementations in which the elastomeric sip top 120 is employed in this manner, leakage of food from the food pouch may be minimized or prevented. Moreover, the relatively rigid nature of the holder 104 may prevent any food pouch 206 disposed therein from being squeezed—further minimized spills and leakage.

Figure 4:
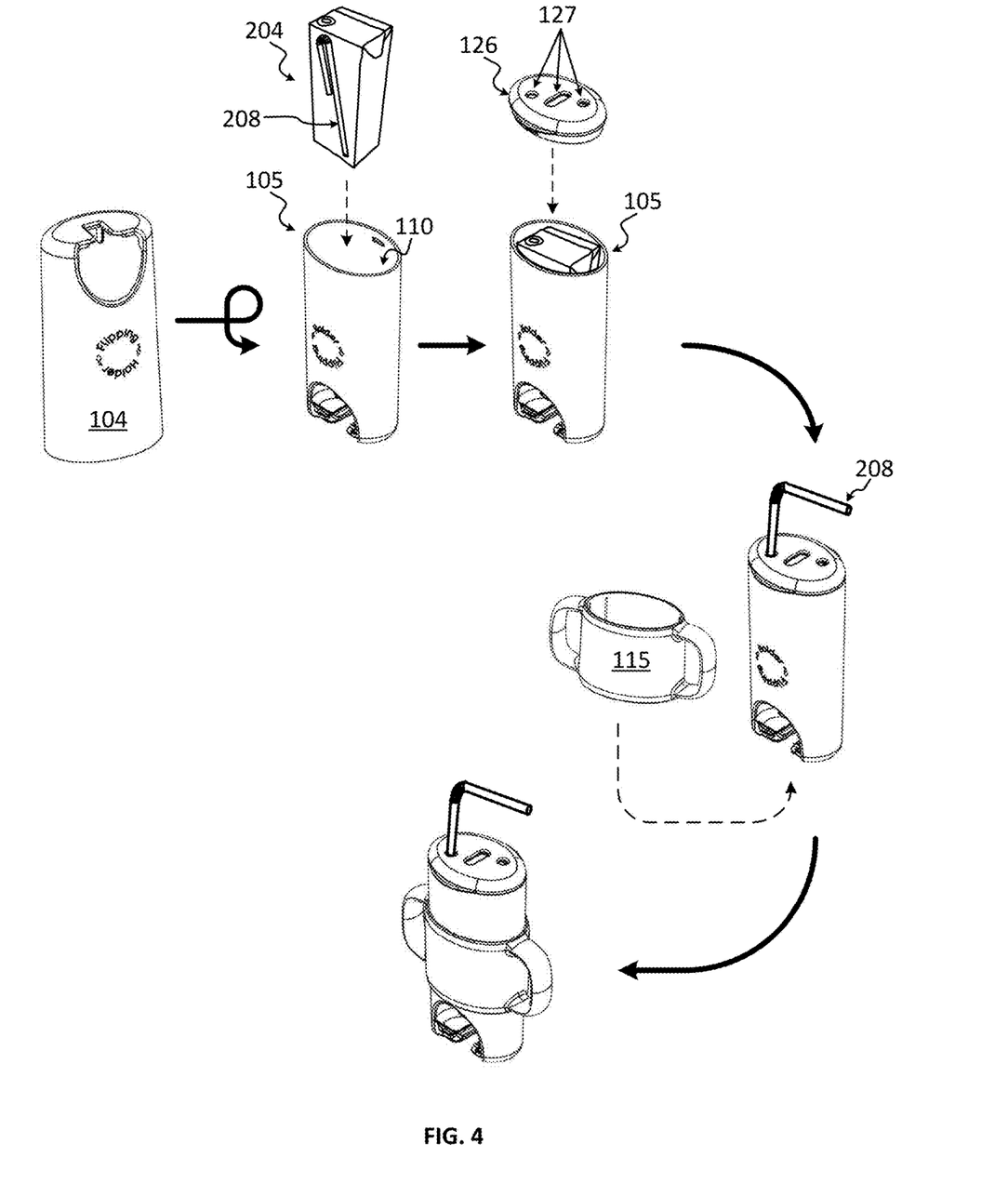
FIG. 4 depicts various components of the snack system used with a juice box.

FIG. 4 depicts a process for using various components of the snack system 101 with a juice box 204. In a first step, the holder 104 may be rotated such that its open first end 105 is facing up. In a second step, a juice box 204 may then be disposed in the open interior 110 (with the straw 208 removed first). In a third step, the cover 126 may be disposed on the open first end 105. As shown, the cover 126 may include one or more openings 127 suitable for passage of a straw (e.g., straw 208). In a fourth step, the previously separated straw 208 may be disposed through an opening 127 in the lid 126 and into the juice box 204. (In some implementations, the straw 208 may be disposed in the juice box 204 in the second step, before the juice box 204 is disposed into the holder 104; and the straw 208 then may be fed through the opening 127 in the lid.) Optionally, in a fifth step, the elastomeric handle 115 may be disposed on the holder 104. In implementations such as the one just described, leakage of juice from the juice box 204 may be minimized, as the relatively rigid nature of the holder 104 may prevent the juice box 204 from being directly squeezed.

Figure 5:
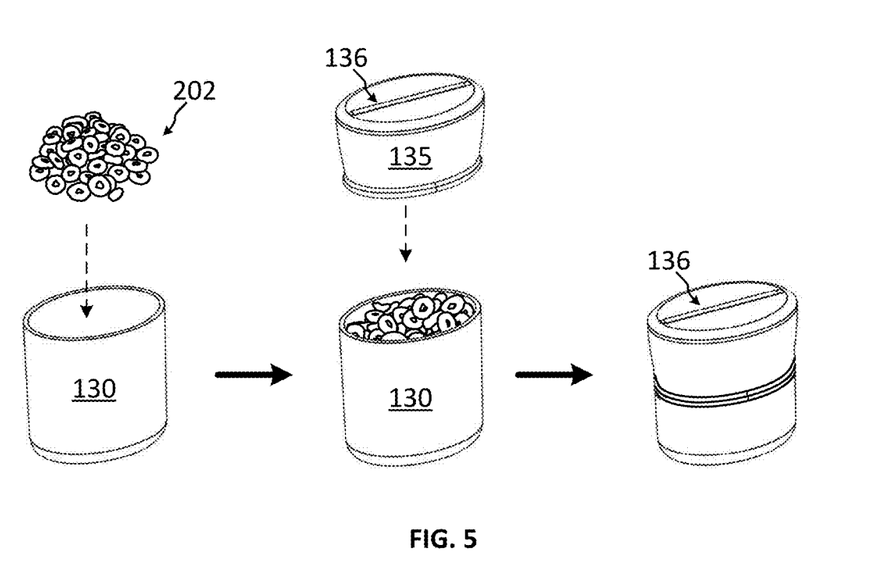
FIG. 5 depicts various components of the snack system used with dry snacks.

FIG. 5 depicts a process for using various components of the snack system 101 with dry snacks 202. As depicted in a first step, dry snacks 202 may be disposed in the snack cup 130. In a second step, the elastomeric snack top 135 may be disposed onto the snack cup 130—thereby protecting the dry snacks 202 from being spilled. To access the dry snacks 202, snackers may insert their hands through the snack-access slot 136.

Figure 6:
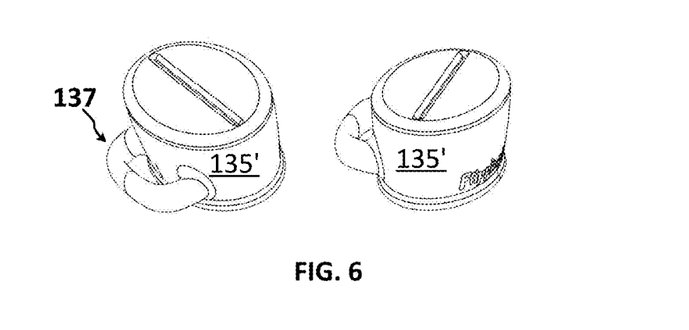
FIG. 6 illustrates an exemplary snack top with a handle.

FIG. 6 illustrates two views of an alternative elastomeric snack top 135' with at least one handle 137. Such an alternate elastomeric snack top 135' may be used in place of the elastomeric snack top 135 to provide another way for users to grip the elastomeric snack top 135' and any snack cup 130 coupled thereto.

Figure 7:
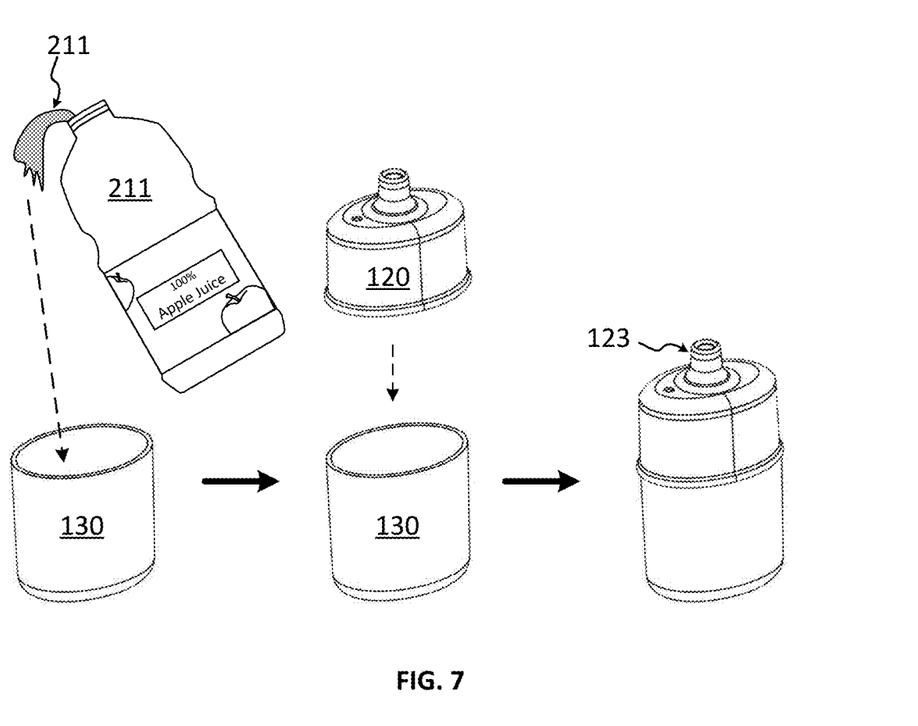
FIG. 7 depicts various components of the snack system used with juice.

FIG. 7 depicts a process for using various components of the snack system 101 with juice 211 (e.g., juice 211 that is not already contained within a juice box 204). As depicted in a first step, the juice 211 may be disposed in the snack cup 130. In a second step, the elastomeric sip top 120 may be disposed onto the snack cup 130. Subsequently, a snacker may access the juice 211 through the nipple 123, which may prevent or minimize inadvertent spillage.

Figure 8:
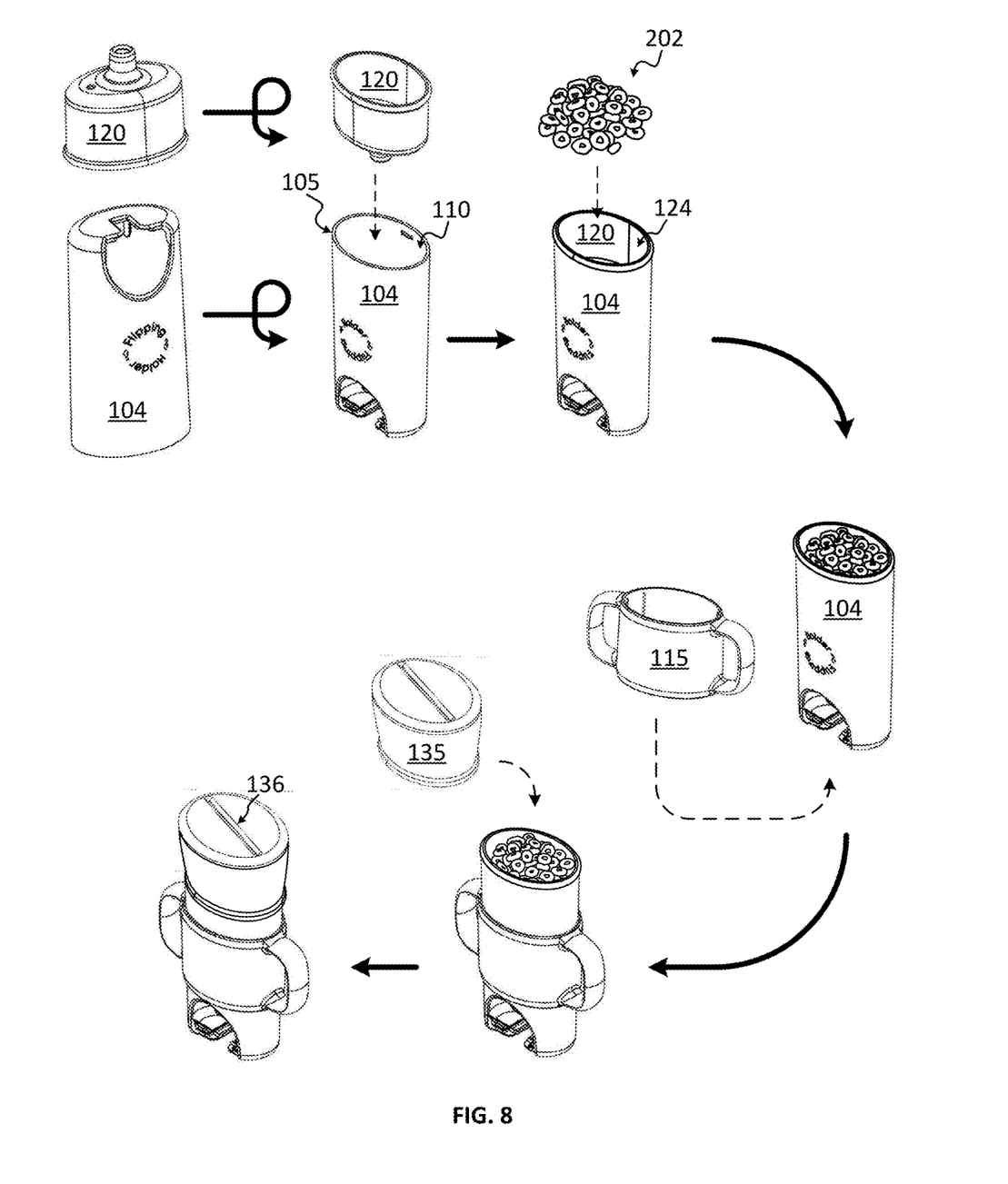
FIG. 8 depicts various components of the snack system used in another manner with dry snacks.

FIG. 8 depicts a process for using various components of the snack system 101 with dry snacks 202 in a different manner than that described above. In particular, in a first step, the holder 104 and the elastomeric sip top 120 may be rotated, such that their respective openings are face-up. In a second step, the elastomeric sip top 120 may be disposed inside the open interior 110 at the first end 105 of the holder 104. In a third step, dry snacks 202 may be disposed in the upside-down elastomeric sip top 120, in the interior cavity 124. In an optional fifth step, the elastomeric handle 115 may be disposed on the holder 104. In an optional sixth step, the elastomeric snack top 135 may be disposed on the holder 104. Subsequently, snackers may insert their hands through the snack-access slot 136 to access the dry snacks 202.

In some implementations, the snack cup 130 may be configured to fit in the open interior 110 at the first end 105 of the holder 104; and in such implementations, the snack cup 130 may be employed in place of the upside-down elastomeric sip top 120 shown in FIG. 7.

Several implementations have been described with reference to exemplary aspects, but it will be understood by those skilled in the art that various changes may be made and equivalents may be substituted for elements thereof without departing from the contemplated scope. For example, various materials having different hardness levels may be employed; components may be omitted from some implementations, and other components may be added to other implementations; components may be shaped or sized differently than described; various food items may be accommodated; "dry" snacks may more broadly include snacks that are in the form of individual kernels or pieces, regardless of moisture content; multiple components of the snack system may be used simultaneously to store multiple types of snack or food items; subsets of the snack system may be used; different configurations may use or not use the elastomeric handle; different configurations may use or not use the elastomeric snack top; drink pouches and drink boxes may be accommodated. In general, "about," "approximately" or "substantially" may mean within 1%, or 5%, or 10%, or 20%, or 50%, or 100% of a nominal value.

Many other variations are possible, and modifications may be made to adapt a particular situation or material to the teachings provided herein without departing from the essential scope thereof. Therefore, it is intended that the scope include all aspects falling within the scope of the appended claims.

What is claimed is:

1. A snack system comprising:
    a holder having (i) a generally frustoconical shape, (ii) a first end that is open, (iii) a second end that defines a slot opening, (iv) a middle portion disposed between the first end and the second end, and (v) a circumferential sidewall (A) that is generally closed except for a sidewall opening adjacent the slot opening and (B) that defines an open interior;
    an elastomeric handle having a retention portion that is configured to be removably coupled to the middle portion with a compression fit, the elastomeric handle further having at least one finger opening;
    an elastomeric sip top having a sip-top sidewall and a sip-top surface; wherein a nipple is disposed on the sip-top top surface, and the sip-top sidewall is configured to be (a) disposed around the circumferential sidewall at the second end or (b) disposed in the open interior at the first end;
    an elastomeric snack top having a snack-top sidewall and a snack-top surface; wherein a snack-access slot is disposed in the snack-top surface, and the snack-top sidewall is configured to be disposed around the circumferential sidewall at the first end;
    a lid configured to be releasably coupled to the first end; wherein the lid comprises at least one opening that is configured to facilitate passage of a drinking straw from outside the holder, through the at least one opening when the lid is coupled to the first end, and into a juice box that is disposed in the open interior; and
    a snack cup that is configured to be (x) removably retained by the second end of the holder through an interference fit, (y) employed with the elastomeric sip top to provide a sip cup function, or (z) employed with the elastomeric snack top to provide a snack cup function.

2. A snack system comprising:
    a holder having (i) a generally frustoconical shape, (ii) a first end that is open, (iii) a second end that defines a slot opening, (iv) a middle portion disposed between the first end and the second end, and (v) a circumferential sidewall (A) that is generally closed except for a sidewall opening adjacent the slot opening and (B) that defines an open interior;

an elastomeric sip top having a sip-top sidewall and a sip-top surface; wherein a nipple is disposed on the sip-top top surface, and the sip-top sidewall is configured to be (a) disposed around the circumferential sidewall at the second end or (b) disposed in the open interior at the first end; and an elastomeric snack top having a snack-top sidewall and a snack-top surface; wherein a snack-access slot is disposed in the snack-top surface, and the snack-top sidewall is configured to be disposed around the circumferential sidewall at the first end.

3. The snack system of claim 2, further comprising an elastomeric handle having a retention portion that is configured to be removably coupled to the middle portion with a compression fit, the elastomeric handle further having at least one finger opening.

4. The snack system of claim 2, further comprising a lid configured to be releasably coupled to the first end; wherein the lid comprises at least one opening.

5. The snack system of claim 4, wherein the at least one opening is configured to facilitate passage of a drinking straw from outside the holder, through the at least one opening when the lid is coupled to the first end, and into a juice box that is disposed in the open interior.

6. The snack system of claim 2, further comprising a snack cup that is configured to be (x) removably retained by the second end of the holder through an interference fit, (y) employed with the elastomeric sip top to provide a sip cup function, or (z) employed with the elastomeric snack top to provide a snack cup function.

* * * * *